March 31, 1970 — J. J. MEANY, JR — 3,504,323
CORROSION TEST APPARATUS
Filed Feb. 7, 1968
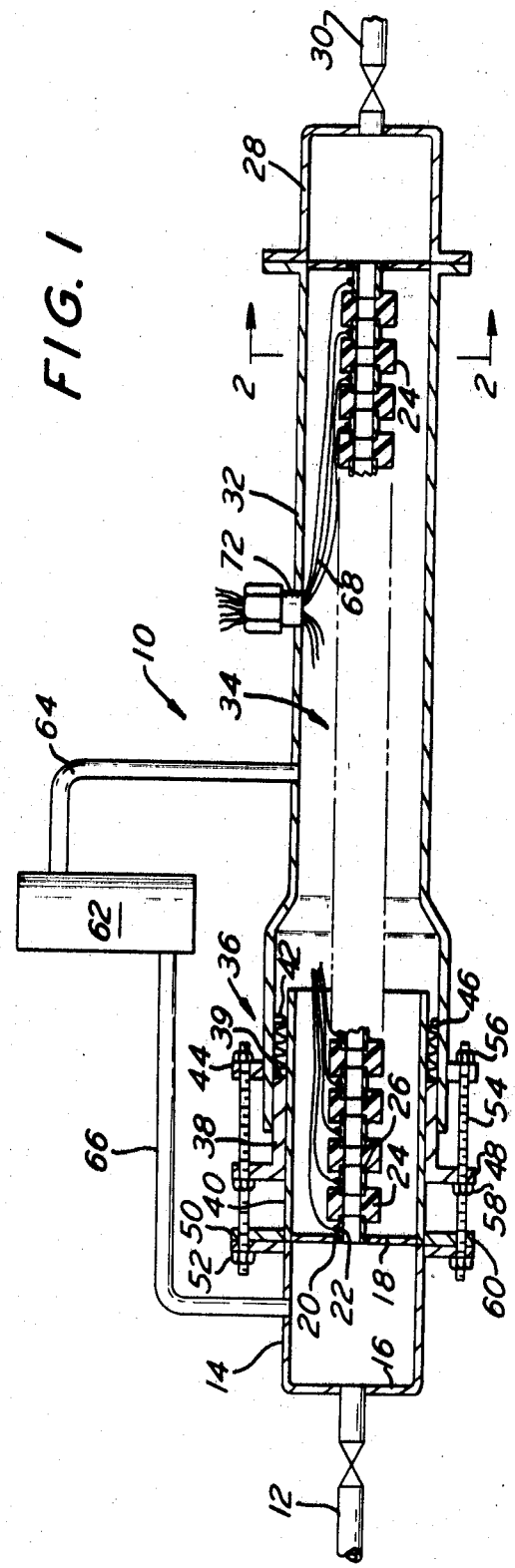
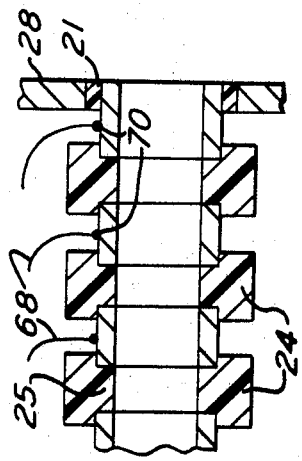
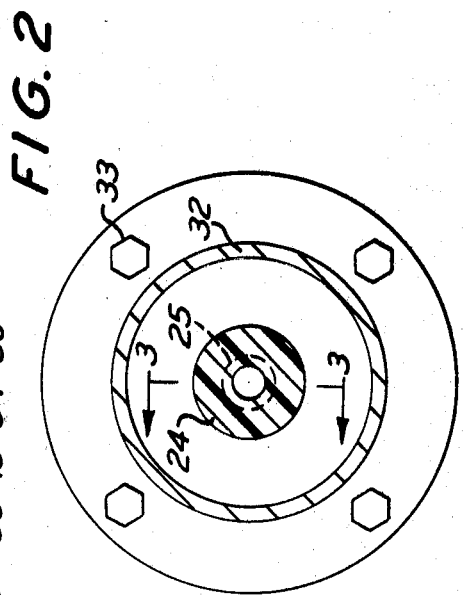
INVENTOR
JOHN J. MEANY JR.
BY
ATTORNEYS.

United States Patent Office 3,504,323
Patented Mar. 31, 1970

3,504,323
CORROSION TEST APPARATUS
John J. Meany, Jr., Rosemont, Pa., assignor to A. V. Smith Engineering Company, Narberth, Pa., a corporation of Pennsylvania
Filed Feb. 7, 1968, Ser. No. 703,733
Int. Cl. H01c 7/00; G01r 27/02; G01n 17/00
U.S. Cl. 338—13          9 Claims

ABSTRACT OF THE DISCLOSURE

Corrosion test apparatus for determining the corrosion rate of tubing and particularly heat exchanger tubing under realistic operating conditions. A heat exchanger tube is separated into various segments which segments are electrically insulated from one another. A corrosive fluid is introduced into the apparatus under specified controlled conditions. The rate of corrosion of the tubing can be calculated by Faraday's Law in order to determine the corrosion rate of the various segments. The various segments of the heat exchanger tube are electrically insulated from one another preferably by fluorocarbon separators and a pressure-equalizing chamber is provided in order to eliminate static pressure across the wall of the segmented heat exchanger tube.

The present invention relates to corrosion test apparatus, and more particularly relates to corrosion test apparatus which will enable the corrosion testing of heat exchanger tubing under realistic operating conditions.

It is well-known that instantaneous corrosion rates of metals in electrolytes can be determined through electrochemical measurements. Usually the methods utilized depend upon the observation of the polarization characteristics of the metal while measured values of electrical current are forced to flow through the electrolyte, both to and from the metal surface. However, no fully acceptable apparatus has been developed to allow the application of such methods to tubing and particularly to heat exchanger tubing under realistic operating conditions.

It is an object of the present invention to provide corrosion test apparatus which will permit corrosion testing of heat exchanger tubing under realistic operating conditions.

It is another object of the present invention to provide corrosion test apparatus which will enable the rapid determination of the rate at which various metals and alloys will corrode when used as heat exchanger tubes.

It is a further object of the present invention to provide corrosion test apparatus which enables corrosion testing of segmented heat exchanger tubes while simulating conditions of turbulence and impingement with respect to certain segments and less severe conditions with respect to other segments.

The above and other objects are accomplished by the present invention. The corrosion test apparatus includes an inlet or entry conduit which is utilized to introduce corrosive fluid at a pre-selected pressure, temperature and velocity to an inlet header. The header has sufficient volume to reduce the flow of velocity to a very low value. The fluid exits from the inlet header and enters the segmented heat exchanger tube and flows through it at the desired velocity. The first and last segment of the heat exchanger tube are electrically insulated from the inlet and discharge headers, respectively, by fluorocarbon rings. The remaining segments of the heat exchanger tube are separated by fluorocarbon separators. The corrosive fluid thereafter enters the discharge header and thence flows out a discharge or exit conduit.

The fluorocarbon separators and segments of heat exchanger tubing are retained within an outer sleeve. The outer sleeve is filled with a fluid of lower specific gravity than the corrosive fluid entering the test apparatus. The fluid in the sleeve is a non-electrical conductor such as transformer oil. A pressure-equalizing chamber is connected by appropriate conduits to both the inlet header and the interior of the sleeve and eliminates static pressure across the wall of the segmented heat exchanger tube. Intermixing of the corrosive fluid and the transformer oil is prevented by the difference between the specific gravities of the two fluids.

The insulating properties of the fluorocarbon separators prevent electrical contact between the tube segments. Further, the tube segments are insulated from the headers by fluorocarbon rings. While fluorocarbon material is utilized in the preferred embodiment, other suitable materials may be utilized without departing from the spirit and scope of this invention.

An electrical connection is provided for each tube segment. The connection consists of an insulated copper wire, one end of which is brazed to an individual tube segment. The other end of the copper wire is extended through a pressure tight fitting which penetrates the outer sleeve wall.

A modified expansion joint is utilized to keep the segmented tube under compression to prevent leakage of the corrosive fluid into the oil-filled chamber surrounding the segmented tube. The pressure-equalizing chamber also reduces the tendency for such leakage since the pressure across the segmented tube wall is only as great as the velocity head through the tube.

The method of calculating the corrosion rate is conventional and forms no part of the present invention. The method will be set forth hereinafter in detail.

For the purpose of illustrating the invention there is shown in the drawings a form which is presently preferred; it being understood, however, that this invention is not limited to the precise arrangements and instrumentalities shown.

FIGURE 1 is a side elevation view, partially in section, of the corrosion test apparatus of the present invention;

FIGURE 2 is a section view taken along the line 2—2 of FIGURE 1; and

FIGURE 3 is a section view taken along the line 3—3 of FIGURE 2.

Referring now to the drawings in detail wherein like reference numerals indicate like structure throughout the several views, there is shown in FIGURE 1 corrosion test apparatus generally indicated by the reference numeral 10.

The apparatus 10 includes an entry or inlet conduit 12 which is connected to an inlet header 14. The header 14 has a front wall 16 and a rear wall 18. The rear wall 18 has an opening therein. Within the opening 18 is provided a non-conductive ring 20. The ring 20 may be composed of fluorocarbon or similar non-conductive material. One end of a segment 22 of tubing is inserted into the fluorocarbon ring 20. The apparatus 10 is particularly adapted to determine the corrosion rate of heat exchanger tubing. Therefore, the segments may hereinafter be referred to as heat exchanger tube segments. The tube segment 22 is insulated from the rear wall 18 of the header 14 by the fluorocarbon ring 20.

A separator 24 is connected to the other end of the heat exchanger tube segment 22. The separator 24 may also be composed of a suitable fluorocarbon or the like. and has a further segment 26 of heat exchanger tubing connected thereto. A plurality of separators indentical to separator 24 are provided and the segments of the heat exchanger tubing are connected to the separators throughout the entire length of the segmented tube. The general arrangement of tube segments and separators is shown in detail in FIGURE 3. By this means, each tube segment is electrically insulated from adjacent tube segments.

The separator 24 has a generally cylindrical shape and has an inner circumferential projection 25. The inside diameter of the separator 24 is slightly smaller than the outer diameter of the segments so that the segments must be forced into the separator 24. The segments are tightly frictionally retained in their desired position and are separated by the projection 25.

The corrosive fluid flows through the tube segments and separators to a discharge header 28. Thereafter, the fluid may flow out a discharge conduit 30. A ring 21, identical in construction to ring 20, may insulate the last segment from the discharge header 28.

An outer sleeve 32 surrounds the tube segments and separators. The outer sleeve 32 defines a chamber 34 between it and the heat exchanger tube segments. At one end the sleeve 32 is connected to the discharge header 28 by bolts 33. The other end of the sleeve 32 cooperates with an expansion joint 36. The expansion joint 36 is provided adjacent the inlet end of the apparatus 10. The expansion joint 36 provides a means for keeping the segmented tube under compression and prevents leakage of corrosive fluid into the chamber 34 surrounding the segmented tube.

The expansion joint 36 includes an intermediate sleeve 38 and an inner sleeve 40. The outer sleeve 32 has a circumferential interior flange 42 thereon. The outer sleeve 32 also has an exterior circumferential flange 44 thereon. A resilient packing 46 is adapted to be received between the end 39 of the intermediate sleeve 38 and the interior flange 42 on the outer sleeve 32. The packing 46 is provided to prevent leakage from the chamber 34.

The intermediate sleeve 38 has circumferential flange 48 thereon. The inner sleeve 40 has circumferential flange 50 thereon. The circumferential flange 50 is fixedly secured to a circumferential flange 52 which is integral with the inlet header 14.

The flanges 44, 48, 50 and 52 have holes therein which are alinged when the flanges are in their desired orientation. A threaded rod 54 is adapted to be received within the aligned holes. A nut 56 is secured to the threaded rod 54 adjacent the flange 44. A nut 58 is secured to the threaded rod 54 adjacent the flange 48. A nut 60 is secured to the threaded rod 54 adjacent the flange 52. By tightening the nut 58, greater pressure may be placed upon the resilient packing 46 in order to prevent leakage. Other desired effects may be obtained by tightening or loosening the nuts 56, 58, and 60. The operation of the expansion joint shown and described is deemed obvious to those skilled in the art from the above discussion, and need not be further set forth herein in detail.

A conventional pressure-equalizer 62 is provided in order to equalize the static pressure across the walls of the segments of the heat exchanger tube. The pressure-equalizer 62 has a conduit 64 connecting the upper end thereof with the chamber 34. The pressure-equalizer 62 has a conduit 66 connecting the lower end thereof with the header 14. Intermixing of the corrosive fluid and the uuid within chamber 34 is prevented by the difference between the specific gravities of the two fluids. In the preferred embodiment, transformer oil, which is an non-electrical conductor, is utilized in the chamber 34.

A plurality of insulated copper wires 68 are secured to the segments of the heat exchanger tube. The insulated copper wires may be brazed at 70 to the various segments of the heat exchanger tube. The wires 68 exit from the chamber 34 through a pressure tight fitting 72 in the outer sleeve 32. The ends of the copper wires which are drawn through the fitting 72 will be connected as will appear hereinafter. The exact method of measuring the corrosion rate of the tubing is not claimed to be part of the instant invention. This invention is directed to the apparatus which has been set forth herein in detail.

The use of the apparatus is deemed apparent from the above discussion. Corrosive fluid is introduced into the apparatus under spesific controlled conditions desired for the test run. Suitable measurements are taken and the corrosion rate of each of the various tube segments may be easily obtained.

The following is the procedure for measuring the rate of corrosion of the segments. The external lead of the wire 68 brazed to the segment 22 is connected to a potentiometer, which is in turn connected to the external lead which is brazed to segment 26. The voltage between the two segments is observed and recorded. The lead of the wire 68 brazed to the segment 22 is also connected to the negative pole of a battery. A lead from the positive pole of the battery is then connected to an ammeter, thence through a variable resistor, thence to the shell of the metallic inlet header 14. The variable resistor is adjusted so that a very small amount of current flows to the inlet header shell, and thereafter to the contained corrosive fluid, since insulator 20 prevents the current from otherwise reaching the insulated tube segment 22.

The current must therefore flow through the corrosive fluid to the tube segment 22. If the value of current flow selected is proper, it will cause a slight change in the solution potential of the segment 22. There will be no change in the solution potential of the segment 26 since it is insulated from the segment 22. Therefore, none of the test current will flow to the segment 26. The change in the solution potential of segment 22 will therefore be identical to the change in potential between segments 22 and 26. This value is indicated by the potentiometer connected to the leads of the wires which are brazed to these two segments.

The change in potential is observed and recorded. The variable resistor is then adjusted to allow more current to flow, and the potentiometer reading again observed and recorded. This procedure is continued for a range of current values until a change in the relationship between the current and voltage is noted. The connections to the battery are then reversed, and the procedure repeated with current flowing in the opposite direction until a change in the current voltage relationship is noted.

The value of local action corrosion for the segment is then $$\frac{I_1 \times I_2}{I_1 + I_2}$$

where $I_1$ is the value of current at the point of relationship-change for the first run, and $I_2$ is the value of current at the point of relationship-change for the second run. The actual rate at which the segment is corroding can then be calculated by Faraday's Law.

The procedure can then be repeated for other segments of the tube thus obtaining a detailed analysis of the nature and location of that corrosion which will occur if tubes of the material tested are used in a heat exchanger operating at the test conditions.

While the invention has been described as particularly adapted to measure the corrosion rate of heat exchanger tubing, it is not limited thereto. The corrosion rate of any other tubing to be used for any other purpose could also be determined by use of the apparatus of the present invention.

I claim:

1. Corrosion test apparatus for testing the corrosive effect of corrosive fluid on tubing comprising an inlet conduit, a plurality of segments of tubing in communication with said inlet conduit, electrical insulating means electrically separating each of said plurality of tubing segments from one another, and conductive means connected to said tubing segments for connection to means determining corrosion rates.

2. Corrosion test apparatus as set forth in claim 1 including an inlet header, said inlet header having a front and rear wall, an opening in the rear wall of said header, non-conductive means for retaining one of said plurality of segments in the opening in said rear wall, the other end of said segment being connected to a separator made of non-electrically conductive material.

3. Corrosion test apparatus as set forth in claim 1 including a sleeve defining a chamber around said tube segments, a non-conductive liquid in said test chamber said conductive means being a copper insulated wire brazed to each of said plurality of segments and passing through said chamber.

4. Corrosion test apparatus as set forth in claim 1 including means for pre-selecting pressure, temperature and velocity of the corrosive liquid to be passed through said segments, an outer sleeve spaced from said segments and insulating means and defining a chamber thereabout, and a non-conductive and non-corrosive liquid retained within said chamber.

5. Corrosion test apparatus as set forth in claim 1 including a chamber spaced about said segments and insulating means, said chamber having an inlet header, said inlet header having a front and rear wall, an opening in the rear wall of said header, non-conductive means for retaining one of said plurality of segments in the opening in said rear wall, the other end of said segment being connected to a separator made of a non-electrically conductive material.

6. Corrosion test apparatus in accordance with claim 5 including a non-conductive and non-corrosive liquid retained within the chamber, and pressure-equalizing means for eliminating the static pressure across the walls of said segments.

7. Corrosion test apparatus in accordance with claim 1 including a sleeve defining a chamber around said tube segments, pressure-equalizing means for eliminating static pressure across the walls of said segments, and a non-conductive liquid in said chamber.

8. Corrosion test apparatus as set forth in claim 1 wherein said electrical insulating means are made of a fluorocarbon material.

9. Corrosion test apparatus for testing the corrosive effect of corrosive fluid in tubing comprising an inlet conduit, a plurality of segments of tubing in communication with the said inlet conduit, a plurality of electrically non-conductive separators joining said segments to each other in open communication, electrical conductive means connected to each of said tubing segments for connection to means for determining corrosion rates, a chamber spaced about said segments, said chamber having an inlet header, said inlet header having a front and rear wall, an opening in the rear wall of said header, non-conductive means for retaining one of said plurality of segments in the opening in said rear wall, a non-conductive and non-corrosive liquid in said chamber, pressure-equalizing means connected to said chamber and to said header, and an outlet header in communication with said chamber.

References Cited

UNITED STATES PATENTS

| | | | |
|---|---|---|---|
| 2,947,679 | 8/1960 | Schaschl et al. | 324—65 |
| 3,155,733 | 11/1964 | Rohrback et al. | 338—13 |
| 3,264,561 | 8/1966 | Gustafson | 338—13 X |
| 3,358,229 | 12/1967 | Collins | 324—65 |
| 3,418,848 | 12/1968 | Schaschl | 73—86 |

RICHARD A. FARLEY, Primary Examiner

H. C. WAMSLEY, Assistant Examiner

U.S. Cl. X.R.

73—86; 204—195; 324—65